United States Patent
Watts

(10) Patent No.: US 6,919,999 B2
(45) Date of Patent: Jul. 19, 2005

(54) PASSIVE FOCUS DEVICE

(75) Inventor: Alan Watts, Winter Park, FL (US)

(73) Assignee: Lockheed Martin Corporation, Bethesda, MD (US)

( * ) Notice: Subject to any disclaimer, the term of this patent is extended or adjusted under 35 U.S.C. 154(b) by 212 days.

(21) Appl. No.: 10/462,612

(22) Filed: Jun. 17, 2003

(65) Prior Publication Data

US 2004/0257682 A1 Dec. 23, 2004

(51) Int. Cl.$^7$ .......................... G02B 7/02; G01N 21/00; H04N 3/22
(52) U.S. Cl. .................. 359/823; 359/820; 359/824; 356/72; 348/745
(58) Field of Search ................................ 359/820, 822, 359/823, 824, 814, 819, 696, 698; 356/72; 348/745, 785; 236/100

(56) References Cited

U.S. PATENT DOCUMENTS

| | | | |
|---|---|---|---|
| 1,325,936 A | 12/1919 | Fouasse | |
| 3,612,664 A | 10/1971 | Berman | |
| 3,888,568 A | 6/1975 | Norris et al. | |
| 4,494,693 A | 1/1985 | Bachle | |
| 4,525,745 A | * 6/1985 | Ghaem-Maghami et al. | 348/745 |
| 4,919,519 A | * 4/1990 | Fantozzi et al. | 359/820 |
| 5,225,941 A | * 7/1993 | Saito et al. | 359/824 |
| 5,313,333 A | 5/1994 | O'Brien et al. | |
| 5,383,168 A | 1/1995 | O'Brien et al. | |
| 5,406,417 A | 4/1995 | Denvenyi | |
| 5,557,474 A | 9/1996 | McCrary | |
| 5,587,846 A | * 12/1996 | Miyano et al. | 359/824 |
| 5,633,763 A | * 5/1997 | Suzuki et al. | 359/822 |
| 5,731,917 A | * 3/1998 | Inoue | 359/820 |
| 5,822,133 A | 10/1998 | Mizuno et al. | |
| 5,936,717 A | 8/1999 | Viola | |
| 6,134,057 A | * 10/2000 | Ueyama et al. | 359/821 |
| 6,215,605 B1 | * 4/2001 | Kuwana et al. | 359/824 |

OTHER PUBLICATIONS

Spindler & Hoyer, XP–002291960, p. N12, 1993.

* cited by examiner

Primary Examiner—Loha Ben
(74) Attorney, Agent, or Firm—Burns, Doane, Swecker & Mathis, LLP

(57) ABSTRACT

A passive focus device including a support rod, an optical assembly translatably mounted on the support rod, and a sealed drive assembly containing a substance that physically changes in response to a temperature change, wherein the drive assembly is configured to move the optical assembly along the support rod based on a physical change of the substance.

11 Claims, 2 Drawing Sheets

PASSIVE FOCUS DEVICE

BACKGROUND OF THE INVENTION

1. Field of the Invention

The present invention generally relates to optics, and, more particularly, to a passive focus device that modifies (for example, corrects) focus shifts of an optical system during temperature changes.

2. Background Information

Temperature changes in the environment can result in variations in the dimensions of the optical paths in optical devices. Over a given temperature change, different materials will expand or contract at different rates in accordance with the material's coefficient of thermal expansion (CTE). Differing CTE's in an apparatus can result in non-uniform structural changes, thereby impacting optical performance.

Athermalized focus mechanisms can address a focus shift of an optical system during changing temperatures by moving and positioning optical elements to compensate for the shift; such mechanisms can be active or passive in nature. An active motor and drive screw apparatus has been used to provide temperature compensation in, for example, U.S. Pat. No. 5,936,717 (Viola), the disclosure of which is hereby incorporated by reference in its entirety. Additional active athermalizing processes include dynamic focus mechanisms driven by a motor and drive screw with feedback given by temperature sensors and a potentiometer. Actively controlled bellows devices with external pressure controllers are also known.

A passive volume expansion apparatus to provide temperature compensation is described in, for example, U.S. Pat. No. 3,612,664 (Berman), the disclosure of which is hereby incorporated by reference in its entirety. As described therein, linear motion is transferred through a linkage to drive a lens. Additional passive athermalizing techniques include apparatus utilizing a CTE mismatch in solid structures to affect a change in dimensions.

Replacing a dynamic mechanism with a passive device can reduce cost, weight, volume and CCA board space. However, known passive drives are usually limited to small displacements, have limited travel rates, and can exhibit hysteresis problems.

SUMMARY OF THE INVENTION

According to an exemplary embodiment of the present invention, a passive focus device is provided, including a support rod, an optical assembly translatably mounted on the support rod, and a sealed drive assembly containing a substance that physically changes (e.g., volumetrically changes, dilates, contracts or changes in shape without a volumetric change) in response to a temperature change, wherein the drive assembly is configured to move the optical assembly along the support rod based on a physical change of the substance.

BRIEF DESCRIPTION OF THE DRAWINGS

Other objects and advantages of the invention will become apparent from the following detailed description of preferred embodiments in connection with the accompanying drawings in which like numerals designate like elements and in which.

DETAILED DESCRIPTION OF THE PREFERRED EMBODIMENTS

Figure 1:
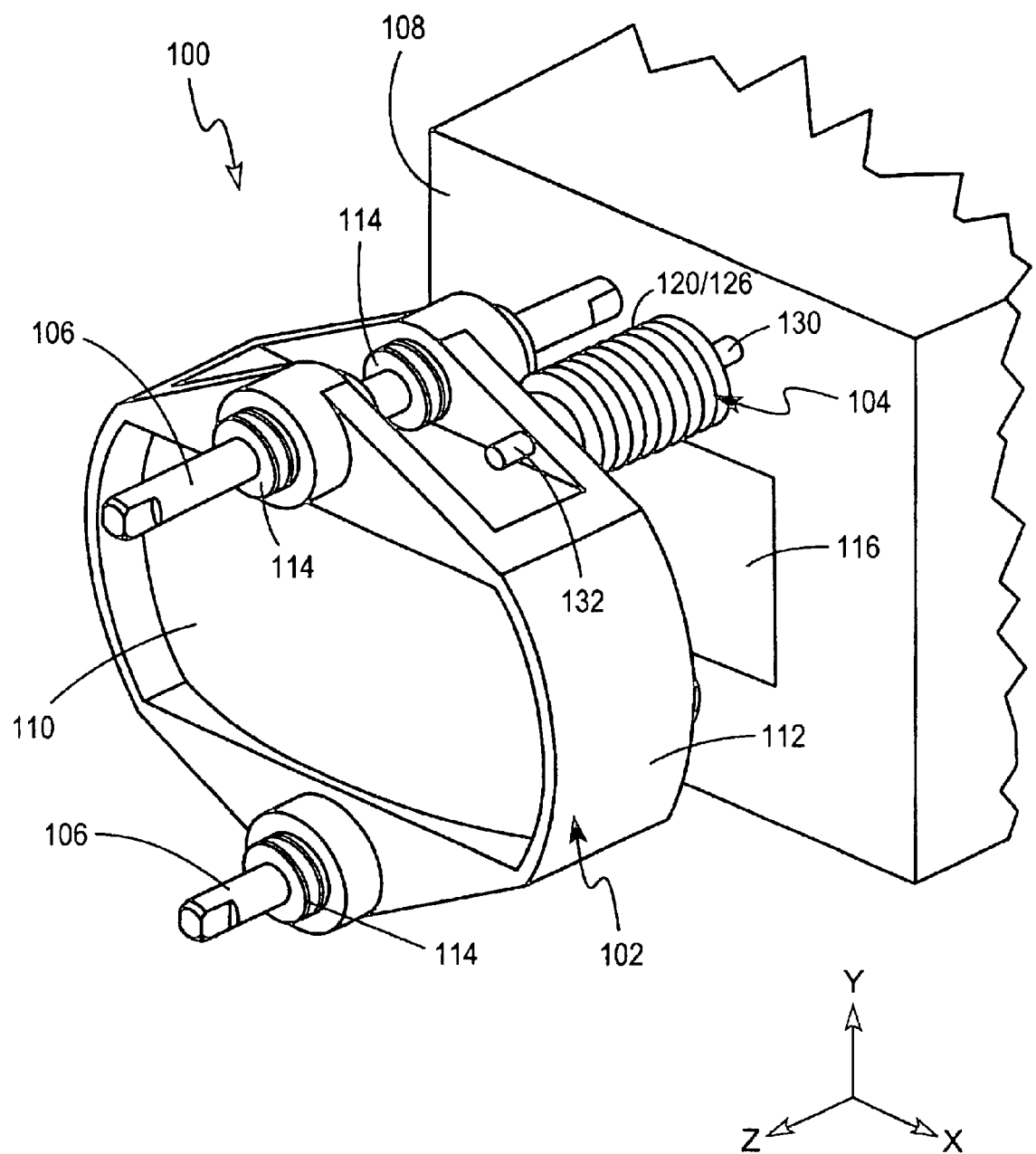
FIG. 1 is a perspective view of a focus device in accordance with an exemplary embodiment of the present invention.

An exemplary embodiment of the present invention is represented in FIG. 1 as passive focus device 100, which can be used to adjust the focal point of an optical system when properties of the optical system are changed due to changes in temperature (e.g., ambient or otherwise). For example, focus device 100 can be used as an attachment to, or a component of, a larger optical system, where an overall index of refraction changes when ambient temperature changes. In this environment, focus device 100 can be used to maintain a controlled (for example, constant) focal point for the overall system, which can be a night vision, imaging, or targeting system, for example. Alternatively, focus device 100 can be used in any setting where it is desirable to passively position an optical assembly in response to a temperature change.

In FIG. 1, focus device 100 is shown to be mounted to a support frame 108, which can be a component of another apparatus. For example, support frame 108 can be a housing or mounting platform for a weapon targeting system, or any desired support structure. Support frame 108 can include an aperture 116, which can, for example, include a fixed focus lens. Also, the components of focus device 100 are shown in FIG. 1 as arranged in the x-axis, y-axis, and z-axis; however, focus device 100 and its components can be oriented along any axes.

The exemplary focus device includes a support rod, such as one of support rods 106 (FIG. 1). Support rods 106 can be made of any formable material (e.g., metal or polymer) and can have any cross-sectional shape (e.g., circular or polygonal or other shape). FIG. 1 illustrates focus device 100 as including two support rods 106, although this quantity can be lesser or greater. Also, FIG. 1 shows support rods 106 as linearly arranged along the designated z-axis (i.e., the longitudinal axes of support rods 106 are arranged in the z-axis). In the FIG. 1 embodiment, the longitudinal axis is the axis along which an optical assembly translates. In alternate embodiments, support rods 106 can include any amount of curvature along their longitudinal axes.

As shown in FIG. 1, each support rod 106 is fixedly mounted on support frame 108 at a first end. At a second end, each support rod 106 can be fixedly mounted to another portion of support frame 108 or to a separate assembly. The connection between support rods 106 and support frame 108 can be accomplished by any means for fixedly mounting a rod (e.g., welding, adhesives, set screws or other attachment mechanism or method).

Also provided is an optical assembly (e.g., optical assembly 102 in FIG. 1) translatably mounted on the support rod. As shown in FIG. 1, optical assembly 102 (which can also be referred to as a focus cell) includes a lens 110 and a lens frame 112. Lens 110 can be made of any material which possesses a desired transparent or translucent quality (e.g., glass or polymer) and can be shaped to provide any index of refraction. In FIG. 1, lens 110 is shown to be in optical alignment with aperture 116. Lens frame 112 encompasses an outer periphery of lens 110 and can be made of any desired (e.g., formable) material (including, but not limited to, any metal or polymer).

Lens frame 112 is shown in FIG. 1 as mounted on support rods 106 with optional friction-reducing components 114, which can be any means for reducing friction between two components moving relative to each other. For example, friction-reducing components 114 can be linear roller bearings or polished plastic sleeves or any desired components or material. Alternatively, lens 110 can be directly and translatably mounted on support rods 106. The centration and tilt of lens 110 are controlled by tolerances of friction-reducing components 114, support rods 106, and lens frame 112. In this way, optical assembly 102 can be linearly translated along support rods 106. Alternatively, if support rods 106 include some amount of curvature along their longitudinal axes, optical assembly 102 can be translated along support rods 106 in a non-linear manner.

The exemplary focus device also includes a sealed (e.g., statically sealed) drive assembly (e.g., drive assembly 104 in FIG. 1) containing a substance (e.g., substance 218 in FIGS. 2A and 2B) that physically changes (e.g., volumetrically changes, dilates, contracts, or changes in shape without a volumetric change) in response to a temperature change (e.g., ambient temperature change or any controlled temperature change). To achieve this, a substance with a suitable coefficient of thermal expansion over the desired temperature range of interest can be selected. As shown in FIG. 1, drive assembly 104 is arranged as a bellows, which can be made of any formable material (e.g., metal, plastic and so forth). Alternatively, drive assembly 104 can be arranged as a component of any other shape (e.g., spherical).

Figure 2A:
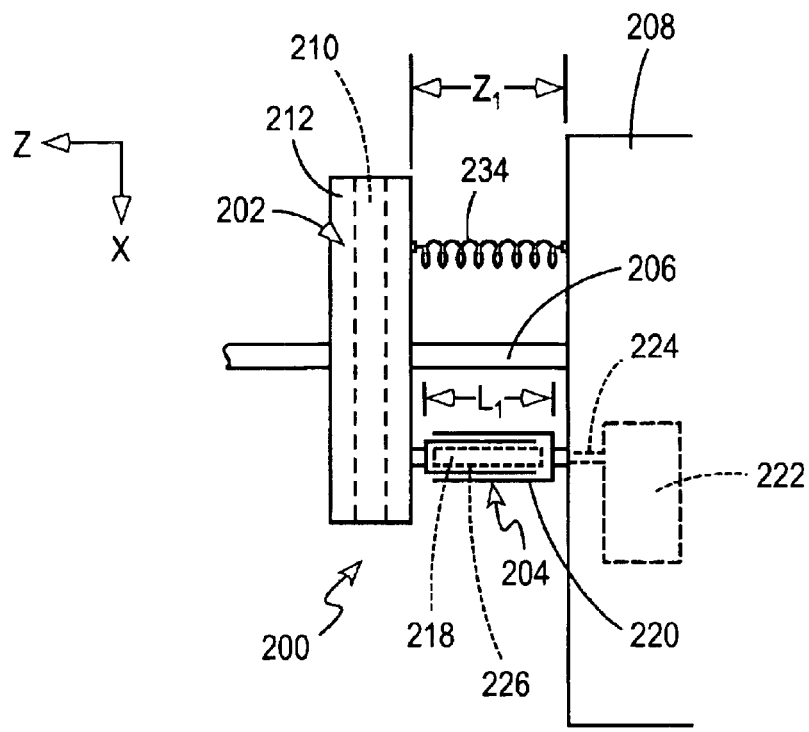
FIGS. 2A and 2B are top views of a focus device at different ambient temperatures in accordance with another embodiment of the present invention.
Figure 2B:
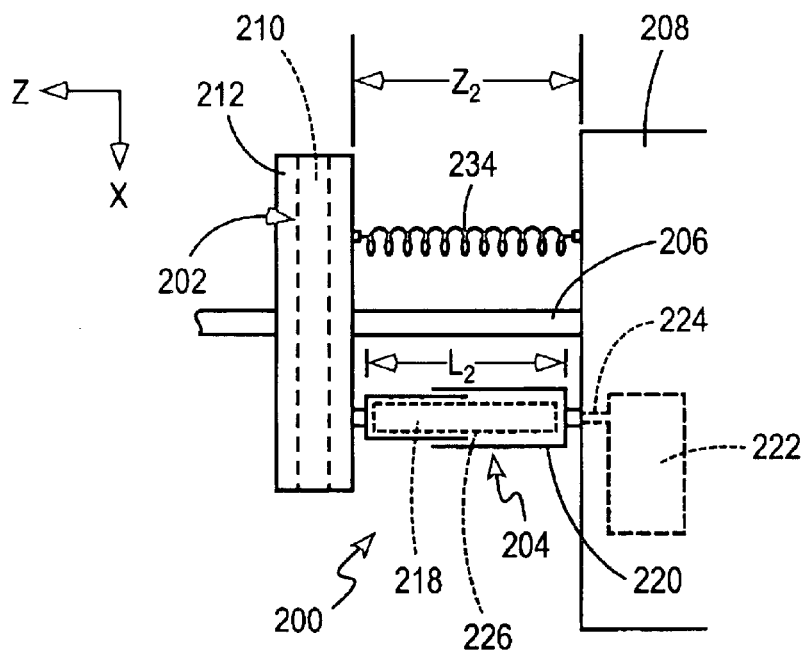

In the examples of FIGS. 2A and 2B, drive assembly 204 is shown as substantially cylinder-shaped. The exemplary drive assembly includes an expandable enclosure (e.g., expandable enclosure 226 in FIGS. 2A and 2B) that contains the substance, and an outer shell (e.g., outer shell 220).

In the FIG. 1 example, outer shell 120 is shaped as a cylindrical accordion, and an inner surface of outer shell 120 acts as an expandable enclosure 126, due to the bellows arrangement of drive assembly 104.

In the examples of FIGS. 2A and 2B, drive assembly 204 includes an expandable enclosure 226 and an outer shell 220 composed of two nested, cylindrical portions. Alternatively, outer shell 220 can be arranged as any means for constraining an expansion of a contained substance in a particular direction or directions. For example, outer shell 220 substantially constrains movement (i.e., expansion or contraction) of expandable enclosure 226 along the z-axis in FIGS. 2A and 2B. Alternatively, an expandable enclosure 226 can be used without the use of an outer shell 220. Expandable enclosure 226 can be formed as a one-piece component made of any material (e.g., elastic material) that is impermeable with respect to the substance it contains, while outer shell 220 can be made of any formable material. Expandable enclosure 226 can be fixedly attached by its outer surface to an inner surface of outer shell 220, or can alternatively be unattached to outer shell 220. Both expandable enclosures 126 and 226 can, of course, expand and contract.

The exemplary substance (e.g., substance 218 in FIGS. 2A and 2B) can be a liquid or a gas, depending on an application of the exemplary focus device, and physically changes in response to a temperature change. That is, the exemplary substance can increase or decrease in volume and/or shape due to a temperature change of the environment surrounding the exemplary focus device. Substance 218 can be incompressible or pressurized to a point where it is incompressible for loads experienced by an overall system (e.g., focus device 200 and any attached assemblies). As a non-limiting example, substance 218 can be ethylene glycol.

At least one of the expandable enclosure and the outer shell can be statically sealed. For example, with reference to FIG. 1, drive assembly 104 can be filled with an exemplary substance and statically sealed by, for example, a screw valve, welding, or any other means for statically sealing a joint. In the examples of FIGS. 2A and 2B, expandable enclosure 226 can be filled with substance 218 and statically sealed by any means for statically sealing a joint.

In an exemplary embodiment, the drive assembly (e.g., one of drive assemblies 104 and 204) is configured to change based on a physical change (e.g., volumetric change, dilation, contraction or change in shape without a volumetric change) of the substance, which is, in turn, based on a temperature change. The drive assembly change can, for example, be due to a phase change of the substance. In the FIG. 1 example, a change of the exemplary substance contained within drive assembly 104 changes the shape of drive assembly. That is, an expansion or a contraction of the volume of the contained substance can alter the length of drive assembly 104 along the z-axis and the radius of a cross-section of drive assembly 104 (e.g., in the plane including the y-axis and the x-axis). In FIGS. 2A and 2B, an expansion or a contraction of the volume of substance 218 can alter the overall length of outer shell 220 (i.e., along the z-axis).

In this way, a dimension (e.g., longitudinal length along the z-axis) of an exemplary drive assembly (e.g., one of drive assemblies 104 and 204) can change based on the physical change of the substance. The longitudinal length of an exemplary drive assembly can be parallel to the longitudinal axis of the support rod. For example, in FIGS. 1, 2A, and 2B, both the longitudinal lengths of drive assemblies 104 and 204 and the longitudinal axes of support rods 106 and 206 lie along the z-axis.

In an exemplary embodiment, an optical assembly (e.g., one of optical assemblies 102 or 202) moves along the support rod (e.g., along a longitudinal axis, represented as the z-axis in FIGS. 1, 2A, and 2B) based on a physical change of the drive assembly. For example, as the longitudinal length of drive assembly 104 changes, optical assembly 102 will translate along support rods 106, creating relative movement between optical assembly 102 and support frame 108 and, for example, changing a focal point for an overall system. Such translation can be similarly achieved with drive assembly 204 and optical assembly 202, as shown in FIGS. 2A and 2B.

An exemplary first end of the drive assembly (e.g., first end 130) is fixedly mounted on a support frame, and an exemplary second end of the drive assembly (e.g., second end 132) is fixedly mounted on the optical assembly, the first and second ends being arranged on opposite ends of the drive assembly. In FIG. 1, first end 130 is fixedly mounted to support frame 108 by any means for fixedly connecting two components. For example, first end 130 can be arranged as an end fitting that is mounted onto support frame 108 with the use of screws. Similarly, second end 132 can be fixedly mounted to optical assembly 102 by any means for fixedly connecting two components.

In the FIG. 2A example, focus device 200 is shown to be in a state where ambient temperature is $T_1$. At this ambient temperature, a surface of optical assembly 202 nearest to support frame 208 is at a distance of $Z_1$ from support frame 208. Also, at this state, an overall length of drive assembly 204 is $L_1$. Additionally, a spring 234 can be used to hold drive assembly 204 in compression, thereby maintaining optical assembly 202 at a distance $Z_1$ while allowing translation of optical assembly 202 along support rods 206.

In FIG. 2B, the focus device 200 of FIG. 2A is at a different state where the ambient temperature has been increased to $T_2$. In an exemplary embodiment, substance 218 responds to the ambient temperature change by expanding, resulting in an overall lengthening of drive assembly 204 to $L_2$ (i.e., in the +z direction). The drive assembly 204 is fixedly mounted to both support frame 208 and optical assembly 202, are support rods 206 are fixedly mounted on support frame 208. Because the optical assembly 202 is translatably mounted on support frame 208, the increase in length of drive assembly 204 can result in an increase of distance between optical assembly 202 and support frame 208 (i.e., from $Z_1$ to $Z_2$).

The components of focus device 100 respond to a temperature change in a similar manner. In this way, focus devices 100 and 200 passively respond to a temperature change and properly position optical assemblies 102 and 202, respectively, such that a particular focal point is maintained.

To accurately track a relationship between position of an exemplary optical assembly (e.g., optical assembly 102 or 202) and ambient temperature, the thermal lag of the exemplary focus device (e.g., focus device 100 or 200) can be matched to the thermal lag of an overall system (e.g., an optical system to which focus 100 or 200 is attached). This can be accomplished through proper material selection and the geometry of the exemplary focus device. Thermal lag can, for example, be manipulated by controlling the cross sectional area of the exemplary substance with the shape of the exemplary expandable enclosure (e.g., expandable enclosure 126 or 226). Additionally, a thermoelectric cooler and heater can be added to meet the lag requirements. As a non-limiting example, lens 210 can be made of BK7 glass, while substance 218 can be Ucartherm (Union Carbide ethylene glycol). As shown in Table 1, the thermal properties of BK7 glass and Ucartherm are compared, and these properties determine the thermal lag of the materials:

TABLE 1

Thermal Properties of BK7 and Ucartherm

| Material | Specific Heat (BTU/(lb × F) | Thermal Conductivity (BTU/(hr × ft × F) |
| --- | --- | --- |
| Ucartherm | 0.54 | 0.13 |
| BK7 | 0.21 | 0.64 |

A comparison of the thermal properties shows that BK7 and Ucartherm are in the same order of magnitude with respect to thermal lag (i.e., matching time constants is possible).

The rate of linear travel for an exemplary drive assembly (e.g., drive assembly 104 or 204) can be expressed in units of distance per temperature, and is a function of the CTE of the exemplary substance and the longitudinal length of the exemplary drive assembly. For example, with reference to FIGS. 2A and 2B, assuming that substance 218 is incompressible, that the cross-sectional radius of drive assembly 204 is constant along the z-axis, and that the CTE of substance 218 is substantially constant over a particular temperature range, an overall length for drive assembly 204 can be calculated from the following:

$$dL = \frac{dV}{\text{Area of bellows}} \qquad \text{Eq. 1}$$

substituting into Eq. 1 yields:

$$dL = \frac{(dT \times CTEf \times \pi \times R^2 \times L)}{\pi \times R^2} \qquad \text{Eq. 2}$$

canceling and solving for L yields:

$$L = \frac{dL}{(dT \times CTE_F)} \qquad \text{Eq. 3}$$

where L represents a length of an exemplary drive assembly for a given rate and substance, dL/dT represents a desired rate of length change per temperature change, and $CTE_f$ represents the coefficient of thermal expansion for the substance.

For example, if substance 218 is chosen to be ethylene glycol (which has a CTE of 0.00061 in./C at 20 deg C. and of 0.00062 in./C at 60 deg C.), and if a desired rate of travel for optical assembly 202 is 0.0015 inch/C, then the overall longitudinal length of drive assembly 204 can be calculated as 2.459 in.

The exemplary drive assembly (e.g., drive assembly 204) can be attached to a reservoir (e.g., reservoir 222 via conduit 224) to assist in matching the thermal lags of the exemplary focus drive and an overall system. For example, by shaping reservoir 222 to control the surface area and cross section of substance 218, the cooling rate of substance 218 can be manipulated. The use of reservoir 222 can also provide more flexibility in fitting focus device 200 in a restricted space. Alternately or in addition, the reservoir can be used to change the volume per Equation (1) and thus manipulate the rate of change of movement as a function of temperature change.

It will be appreciated by those skilled in the art that the present invention can be embodied in other specific forms without departing from the spirit or essential characteristics thereof. The presently disclosed embodiments are therefore considered in all respects illustrative and not restricted. The scope of the invention is indicated by the appended claims rather than the foregoing description and all changes that come within the meaning and range and equivalence thereof are intended to be embraced within.

What is claimed is:

1. A passive focus device, comprising:
   a support rod;
   an optical assembly translatably mounted on the support rod; and
   a sealed drive assembly containing a substance that physically changes in response to a temperature change, wherein the drive assembly is configured to move the optical assembly along the support rod based on a physical change of the substance.

2. The focus device of claim 1, wherein the drive assembly is statically sealed, and includes:
   an expandable enclosure that contains the substance, and
      an outer shell, at least one of the expandable enclosure and the outer shell being statically sealed.

3. The focus device of claim 1, wherein a longitudinal length of the drive assembly changes based on a volumetric change of the substance, the longitudinal length of the drive assembly being parallel to a longitudinal axis of the support rod.

4. The focus device of claim 1, wherein a first end of the drive assembly is fixedly mounted on a support frame, and a second end of the drive assembly is fixedly mounted on the optical assembly, the first and second ends being arranged on opposite ends of the drive assembly.

5. The focus device of claim 4, wherein the support rod is fixedly mounted on the support frame.

6. The focus device of claim 1, wherein the substance is incompressible.

7. The focus device of claim 1, wherein the substance is a liquid.

8. The focus device of claim 1, wherein the substance is a gas.

9. The focus device of claim 1, wherein the drive assembly is a bellows.

10. The focus device of claim 1, wherein the drive assembly is attached to a reservoir.

11. The focus device of claim 1, wherein the optical assembly moves along a longitudinal axis of the support rod.

* * * * *